United States Patent
Tong

(10) Patent No.: US 10,450,699 B2
(45) Date of Patent: Oct. 22, 2019

(54) PAPER PROCESSING DEVICE

(71) Applicant: Junchao Huang, Jinhua (CN)

(72) Inventor: Yingtao Tong, Ningbo (CN)

(73) Assignee: Junchao Huang, Jinhua, Zhejiang Province (CN)

( * ) Notice: Subject to any disclaimer, the term of this patent is extended or adjusted under 35 U.S.C. 154(b) by 0 days.

(21) Appl. No.: 16/236,355

(22) Filed: Dec. 29, 2018

(65) Prior Publication Data

US 2019/0136449 A1   May 9, 2019

(30) Foreign Application Priority Data

Apr. 25, 2018 (CN) .......................... 2018 1 0380616

(51) Int. Cl.
*D21C 7/00* (2006.01)

(52) U.S. Cl.
CPC ...................................... *D21C 7/00* (2013.01)

(58) Field of Classification Search
USPC ........................................................ 162/235
See application file for complete search history.

(56) References Cited

U.S. PATENT DOCUMENTS

| 4,072,275 A | 2/1978 | Bartels et al. | |
|---|---|---|---|
| 5,580,007 A * | 12/1996 | Caviezel | B01F 7/161 241/199.12 |
| 9,103,755 B2 * | 8/2015 | Laugharn, Jr. | G01N 1/28 |
| 2015/0204015 A1 * | 7/2015 | Gomi | B29C 35/02 162/261 |
| 2015/0275435 A1 * | 10/2015 | Seki | F21H 17/20 162/5 |
| 2016/0199847 A1 * | 7/2016 | Murayama | B02C 18/0007 162/261 |
| 2016/0229129 A1 * | 8/2016 | Ueno | B29C 70/06 |

(Continued)

FOREIGN PATENT DOCUMENTS

| CN | 101469756 A | 7/2009 |
|---|---|---|
| CN | 205975183 U | 2/2017 |
| CN | 106938349 A | 7/2017 |

(Continued)

OTHER PUBLICATIONS

First Action on the Merits for Chinese Counterpart Application 201810380616.4 dated Oct. 25, 2018.

(Continued)

*Primary Examiner* — Mark Halpern

(57) ABSTRACT

This invention discloses a paper processing device, comprising a bottom block, a connecting cavity fixedly arranged in the bottom block, a penetrating cavity communicated with and arranged in the lower end wall of the connecting cavity. The penetrating cavity is communicated with the exterior space. A lifting motor is fixedly arranged in the lower end wall of the connecting cavity, the upper end wall of output shaft of which is fixedly provided with a driving pulley. A driven pulley in the connecting cavity is arranged on one side of the driving pulley. The lifting motor works to drive the driving pulley to rotate to drive the driven pulley to rotate, so an inner threaded block is driven to rotate to drive a threaded rod to move upwards; then a stirring fan is driven to enter a reaction cavity. The automatic structure adopted by this device realizes automation of paper processing.

6 Claims, 1 Drawing Sheet

(56) References Cited

U.S. PATENT DOCUMENTS

2018/0318840 A1* 11/2018 Devegili .................. A23G 1/12

FOREIGN PATENT DOCUMENTS

| CN | 107159404 A | 9/2017 |
| CN | 107234724 A | 10/2017 |
| CN | 107442242 A | 12/2017 |
| CN | 107519976 A | 12/2017 |

OTHER PUBLICATIONS

Notification of Grant for Chinese Counterpart Application 201810380616.4 dated Nov. 22, 2018.

* cited by examiner

PAPER PROCESSING DEVICE

CROSS-REFERENCES TO RELATED APPLICATIONS

The present application claims priority from Chinese application No. 2018103806164 filed on 2018 Apr. 25 which is hereby incorporated by reference in its entirety.

TECHNICAL FIELD

The invention relates to the technical field of paper processing, in particular to a paper processing device.

BACKGROUND OF THE INVENTION

The processing of paper often involves the crushing of raw materials and the preparation of paper pulp. As there is a lot of manual participation in the process of paper processing, the cost of paper production enterprises remains high, and this device effectively solves this problem.

BRIEF SUMMARY OF THE INVENTION

The aim of the invention is to provide a paper processing device so as to overcome the problems existing in the prior art.

According to the present invention, a paper processing device of the present invention comprises a bottom block, a connecting cavity fixedly arranged in said bottom block, a penetrating cavity communicated with and arranged in the lower end wall of said connecting cavity, wherein said penetrating cavity is communicated with the exterior space, and the lower end wall of said connecting cavity is fixedly provided with a lifting motor, wherein the upper wall of output shaft of said lifting motor is fixedly provided with a driving pulley, wherein a driven pulley in said connecting cavity is arranged on one side of said driving pulley, wherein an inner threaded block is fixedly arranged in said driven pulley, and said inner threaded block is rotatably penetrating through the upper end wall of said connecting cavity and extends into the exterior space, wherein a threaded rod is arranged in and in threaded fit connection with said inner threaded block, and said threaded rod extends into said penetrating cavity, and the upper end face of said threaded rod is rotatably provided with a lifting plate, wherein the lower end face of said lifting plate is fixedly provided with symmetric slide levers, and symmetric penetrating cavities for sliding penetrating from upside to downside are arranged in said bottom block, and said slide levers extend into said penetrating cavities for sliding and are in sliding fit connection with said penetrating cavities for sliding, and the upper end face of said lifting plate is fixedly provided with symmetric heel blocks, and the lower end face of said lifting plate is fixedly provided with a push cylinder, wherein one side of said push cylinder is provided with a connecting rod fixedly connected to lower end face of said lifting plate, and a push plate in sliding fit connection with said connecting rod is fixedly arranged at the lower end face of the push rod of said push cylinder, wherein the upper end face of said push plate is fixedly provided with a coupling shaft, wherein the upper end face of said coupling shaft is fixedly provided with a sliding shaft, and the upper end face of said lifting plate is fixedly provided with a rotating block, wherein an intermediate plate is rotatably arranged in said rotating block, wherein said intermediate plate touches against said heel blocks, and an opening cavity with the opening facing downwards is fixedly arranged in the lower end face of said intermediate plate, and said opening cavity is communicated with a sliding cavity, wherein said sliding cavity is in sliding fit connection with said sliding shaft, and the upper end face of said intermediate plate touches against and is provided with a container, and a reaction cavity with the opening facing upwards is fixedly arranged in said container, wherein a connecting tube is communicated with and arranged in one end wall of said reaction cavity, and a discharge valve is communicated with and arranged in said connecting tube, and one end face of said bottom block is fixedly provided with a fixed rod, wherein one end face of said fixed rod is fixedly provided with a concave block, wherein a concave cavity with the opening facing one side is fixedly arranged in said concave block, wherein a rotating rod is fixedly arranged between the upper and lower end wall of said concave cavity, and a box extending to one side is arranged in said concave cavity, wherein a rotating cavity is fixedly arranged in said box, and said rotating rod extends into said rotating cavity and is in rotational fit connection with said box, wherein a transposition motor is fixedly arranged in the upper end wall of said rotating cavity, and the lower end face of the output shaft of said transposition motor is fixedly provided with a main gear, wherein one side of said main gear is engaged with a pinion fixed with said rotating rod, and a transmission cavity in said box is arranged on one side of said rotating cavity, wherein a revolving motor is fixedly arranged in the upper end wall of said transmission cavity, and the lower end wall of the output shaft of said revolving motor is fixedly provided with a driving gear, wherein one side of said driving gear is engaged with a driven gear, wherein a penetrating rod is arranged in said driven gear, and said penetrating rod is in rotational fit connection with the upper end wall of said transmission cavity, wherein said penetrating rod rotatably penetrates through said transmission cavity and extends into the exterior space, wherein the lower end face of said penetrating rod is fixedly provided with a stirring fan facing to said container, and one end wall of said fixed rod is provided with a warning device.

In a further technical proposal, one side of said transmission cavity is provided with a circular groove in said box, wherein a motor in said box is arranged at the center of circle of said circular groove, and one end wall of the motor is in power connection with a fixed shaft, and the outer surface of said fixed shaft is fixedly provided with a pendulum rod, and said pendulum rod is in sliding fit connection with said circular groove, and one end face of said pendulum rod is fixedly provided with a tube-fixing block, wherein a nozzle is fixedly arranged in said tube-fixing block, and a switching valve is arranged in and communicated with said nozzle.

In a further technical proposal, said sliding shaft is in a spheric structure and said sliding shaft is of the same shape as said sliding cavity, and said coupling shaft is in sliding fit connection with said opening cavity.

In a further technical proposal, the outer surface of said stirring fan is fixedly provided with a plurality of stirring blades.

In a further technical proposal, said inner threaded block is in rotational fit connection with said bottom block through a thrust ball bearing.

In a further technical proposal, the warning device comprises a box block, and a connecting cavity with the opening facing to one side is fixedly arranged in said box block, wherein a wall connecting rod is fixedly arranged between the upper and lower wall of said connecting cavity, wherein the outer surface of said wall connecting rod is rotatably provided with a placing block, and one end face of said placing block is fixedly provided with a warning light.

The benefits of the invention are as follows:

When the present invention is in the initial state, said lifting motor, said push cylinder, said revolving motor and transposition motor are in state of stopping working, and said switching valve and said discharge valve are in a closed state, and said intermediate plate touches against said heel blocks, and said pendulum rod is in a vertical position, so the above structure is at the initial position in the initial state, which can be adjusted in the subsequent work, and the coordination of the device can be effectively improved.

When the device is running, the raw materials of paper are loaded into said reaction cavity and an appropriate amount of reagents are added. Said lifting motor works to drive said driving pulley to rotate to drive said driven pulley to rotate, and at this time, said inner threaded block rotates to drive said threaded rod to move upwards, and then said stirring fan is driven to enter said reaction cavity. Said revolving motor works to drive said driving gear to rotate and then said driven gear is driven to rotate, and then the stirring fan fixed with said penetrating rod rotates to stir and smash the raw materials of paper in said reaction cavity. After the raw materials of paper in said reaction cavity is transformed into paper pulp, said switching valve is turned on so that the water is ejected from said nozzle. The motor in the end face of said box drives said fixed shaft to rotate, so the water spraying angle of said nozzle is changed. Then the impurity on said stirring fan is sprayed and fell into said reaction cavity, and said lifting motor works to drive said container to move downwards, and after said transposition motor continues to drive said main gear to rotate, said pinion is driven to rotate, and then said box rotates to designated position, and at this time, said push cylinder works to drive said push plate to push downwards to turn said intermediate plate over, and at this time, said discharge valve is opened to discharge the paper pulp in said reaction cavity. Thus, the efficiency of paper processing is effectively improved.

The device is simple in structure and convenient to use. The automatic structure adopted by this device realizes the automation of paper processing and effectively reduces the labor cost in the production process.

The above is only the specific embodiment of the invention, but the scope of the invention is not limited thereto, and any changes or substitutions without the creative work should be included in the claimed protection extent of this invention. Therefore, the claimed protection extent of the invention shall be determined with reference to the appended claims.

BRIEF DESCRIPTIONS OF THE DRAWINGS

For better explanation of the technical proposal in the present invention embodiments or the prior art, the drawings to be used in the description of the embodiments or the prior art will be briefly described below. Obviously, the drawings in the following description are only some embodiments of the present invention. For those common technicians in this field, other drawings may also be obtained based on these drawings without any creative work.

DETAILED DESCRIPTION OF THE INVENTION

All of the features disclosed in this specification, or all of the methods or procedures in the process disclosed, may be combined in any way other than mutually exclusive features and/or steps.

Any feature disclosed in this specification (including any additional claims, abstract and drawings) may be replaced by other equivalent or alternative features with similar purposes, unless otherwise stated. That is, unless otherwise stated, each feature is just one example of a series of equivalent or similar features.

Figure 1:
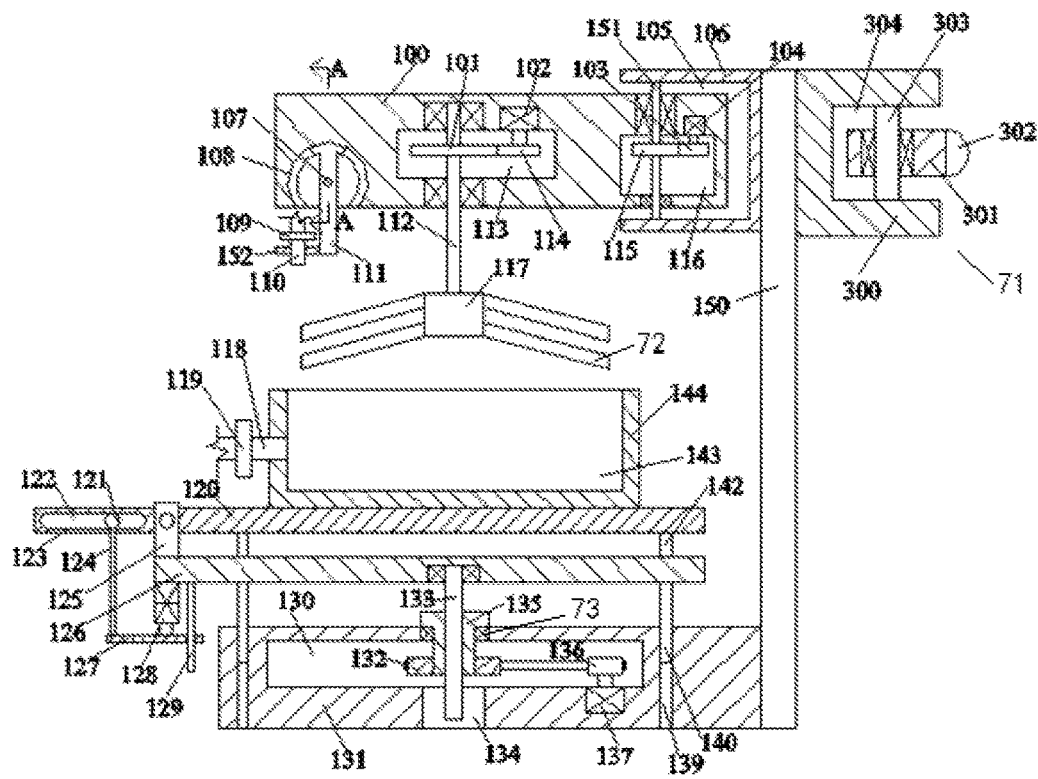
FIG. 1 is the overall structural schematic diagram of a paper processing device in this invention.
Figure 2:
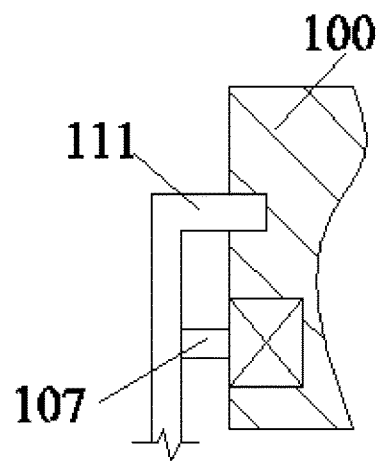
FIG. 2 is a schematic diagram along A-A direction in FIG. 1.

Referring to FIG. 1-2, a paper processing device of the present invention comprises a bottom block 131, a connecting cavity 130 fixedly arranged in said bottom block 131, a penetrating cavity 134 communicated with and arranged in the lower end wall of said connecting cavity 130, wherein said penetrating cavity 134 is communicated with the exterior space, and the lower end wall of said connecting cavity 130 is fixedly provided with a lifting motor 137, wherein the upper wall of output shaft of said lifting motor 137 is fixedly provided with a driving pulley 136, wherein a driven pulley 132 in said connecting cavity 130 is arranged on one side of said driving pulley 136, wherein an inner threaded block 135 is fixedly arranged in said driven pulley 132, and said inner threaded block 135 is rotatably penetrating through the upper end wall of said connecting cavity 130 and extends into the exterior space, wherein a threaded rod 133 is arranged in and in threaded fit connection with said inner threaded block 135, and said threaded rod 133 extends into said penetrating cavity 134, and the upper end face of said threaded rod 133 is rotatably provided with a lifting plate 126, wherein the lower end face of said lifting plate 126 is fixedly provided with symmetric slide levers 140, and symmetric penetrating cavities for sliding 139 penetrating from upside to downside are arranged in said bottom block 131, and said slide levers 140 extend into said penetrating cavities for sliding 139 and are in sliding fit connection with said penetrating cavities for sliding 139, and the upper end face of said lifting plate 126 is fixedly provided with symmetric heel blocks 142, and the lower end face of said lifting plate 126 is fixedly provided with a push cylinder 128, wherein one side of said push cylinder 128 is provided with a connecting rod 129 fixedly connected to lower end face of said lifting plate 126, and a push plate 127 in sliding fit connection with said connecting rod 129 is fixedly arranged at the lower end face of the push rod of said push cylinder 128, wherein the upper end face of said push plate 127 is fixedly provided with a coupling shaft 124, wherein the upper end face of said coupling shaft 124 is fixedly provided with a sliding shaft 121, and the upper end face of said lifting plate 126 is fixedly provided with a rotating block 125, wherein an intermediate plate 120 is rotatably arranged in said rotating block 125, wherein said intermediate plate 120 touches against said heel blocks 142, and an opening cavity 123 with the opening facing downwards is fixedly arranged in the lower end face of said intermediate plate 120, and said opening cavity 123 is communicated with a sliding cavity 122, wherein said sliding cavity 122 is in sliding fit connection with said sliding shaft 121, and the upper end face of said intermediate plate 120 touches against and is provided with a container 144, and a reaction cavity 143 with the opening facing upwards is fixedly arranged in said container 144, wherein a connecting tube 118 is communicated with and arranged in one end wall of said reaction cavity 143, and a discharge valve 119 is communicated with and arranged in said connecting tube 118, and one end face of said bottom block 131 is fixedly provided with a fixed rod 150, wherein one end face of said fixed rod 150 is fixedly provided with a concave block 106, wherein a concave cavity 105 with the opening facing one side is fixedly arranged in said concave block 106, wherein a rotating rod 151 is fixedly arranged between the upper and lower end wall of said concave cavity 105, and a box 100 extending to one side is arranged in said concave cavity 105, wherein a rotating cavity 116 is fixedly arranged in said box 100, and said rotating rod 151 extends into said rotating cavity 116 and is in rotational fit connection with said box 100, wherein a transposition motor 104 is fixedly arranged in the upper end wall of said rotating cavity 116, and the lower end face of the output shaft of said transposition motor 104 is fixedly provided with a main gear 103, wherein one side of said main gear 103 is engaged with a pinion 115 fixed with said rotating rod 151, and a transmission cavity 113 in said box 100 is arranged on one side of said rotating cavity 116, wherein a revolving motor 102 is fixedly arranged in the upper end wall of said transmission cavity 113, and the lower end wall of the output shaft of said revolving motor 102 is fixedly provided with a driving gear 114, wherein one side of said driving gear 114 is engaged with a driven gear 101, wherein a penetrating rod 112 is arranged in said driven gear 101, and said penetrating rod 112 is in rotational fit connection with the upper end wall of said transmission cavity 113, wherein said penetrating rod 112 rotatably penetrates through said transmission cavity 113 and extends into the exterior space, wherein the lower end face of said penetrating rod 112 is fixedly provided with a stirring fan 117 facing to said container 144, and one end wall of said fixed rod 150 is provided with a warning device 71.

Helpfully, wherein one side of said transmission cavity 113 is provided with a circular groove 108 in said box 100, wherein a motor in said box 100 is arranged at the center of circle of said circular groove 108, and one end wall of the motor is in power connection with a fixed shaft 107, and the outer surface of said fixed shaft 107 is fixedly provided with a pendulum rod 111, and said pendulum rod 111 is in sliding fit connection with said circular groove 108, and one end face of said pendulum rod 111 is fixedly provided with a tube-fixing block 152, wherein a nozzle 110 is fixedly arranged in said tube-fixing block 152, and a switching valve 109 is arranged in and communicated with said nozzle 110.

Helpfully, wherein said sliding shaft 121 is in a spheric structure and said sliding shaft 121 is of the same shape as said sliding cavity 122, and said coupling shaft 124 is in sliding fit connection with said opening cavity 123.

Helpfully, wherein the outer surface of said stirring fan 117 is fixedly provided with a plurality of stirring blades 72.

Helpfully, wherein said inner threaded block 135 is in rotational fit connection with said bottom block 131 through a thrust ball bearing 73.

Helpfully, wherein the warning device 71 comprises a box block 300, and a connecting cavity 304 with the opening facing to one side is fixedly arranged in said box block 300, wherein a wall connecting rod 303 is fixedly arranged between the upper and lower wall of said connecting cavity 304, wherein the outer surface of said wall connecting rod 303 is rotatably provided with a placing block 301, and one end face of said placing block 301 is fixedly provided with a warning light 302.

When the present invention is in the initial state, said lifting motor 137, said push cylinder 128, said revolving motor 102 and transposition motor 104 are in state of stopping working, and said switching valve 109 and said discharge valve 119 are in a closed state, and said intermediate plate 120 touches against said heel blocks 142, and said pendulum rod 111 is in a vertical position, so the above structure is at the initial position in the initial state, which can be adjusted in the subsequent work, and the coordination of the device can be effectively improved.

When the device is running, the raw materials of paper are loaded into said reaction cavity 143 and an appropriate amount of reagents are added. Said lifting motor 137 works to drive said driving pulley 136 to rotate to drive said driven pulley 132 to rotate, and at this time, said inner threaded block 135 rotates to drive said threaded rod 133 to move upwards, and then said stirring fan 117 is driven to enter said reaction cavity 143. Said revolving motor 102 works to drive said driving gear 114 to rotate and then said driven gear 101 is driven to rotate, and then the stirring fan 117 fixed with said penetrating rod 112 rotates to stir and smash the raw materials of paper in said reaction cavity 143. After the raw materials of paper in said reaction cavity 143 is transformed into paper pulp, said switching valve 109 is turned on so that the water is ejected from said nozzle 110. The motor in the end face of said box 100 drives said fixed shaft 107 to rotate, so the water spraying angle of said nozzle 110 is changed. Then the impurity on said stirring fan 117 is sprayed and fell into said reaction cavity 143, and said lifting motor 137 works to drive said container 144 to move downwards, and after said transposition motor 104 continues to drive said main gear 103 to rotate, said pinion 115 is driven to rotate, and then said box 100 rotates to designated position, and at this time, said push cylinder 128 works to drive said push plate 127 to push downwards to turn said intermediate plate 120 over, and at this time, said discharge valve 119 is opened to discharge the paper pulp in said reaction cavity 143. Thus, the efficiency of paper processing is effectively improved.

The benefits of the invention are as follows:

When the present invention is in the initial state, said lifting motor, said push cylinder, said revolving motor and transposition motor are in state of stopping working, and said switching valve and said discharge valve are in a closed state, and said intermediate plate touches against said heel blocks, and said pendulum rod is in a vertical position, so the above structure is at the initial position in the initial state, which can be adjusted in the subsequent work, and the coordination of the device can be effectively improved.

When the device is running, the raw materials of paper are loaded into said reaction cavity and an appropriate amount of reagents are added. Said lifting motor works to drive said driving pulley to rotate to drive said driven pulley to rotate, and at this time, said inner threaded block rotates to drive said threaded rod to move upwards, and then said stirring fan is driven to enter said reaction cavity. Said revolving motor works to drive said driving gear to rotate and then said driven gear is driven to rotate, and then the stirring fan fixed with said penetrating rod rotates to stir and smash the raw materials of paper in said reaction cavity. After the raw materials of paper in said reaction cavity is transformed into paper pulp, said switching valve is turned on so that the water is ejected from said nozzle. The motor in the end face of said box drives said fixed shaft to rotate, so the water spraying angle of said nozzle is changed. Then the impurity on said stirring fan is sprayed and fell into said reaction cavity, and said lifting motor works to drive said container to move downwards, and after said transposition motor continues to drive said main gear to rotate, said pinion is driven to rotate, and then said box rotates to designated position, and at this time, said push cylinder works to drive said push plate to push downwards to turn said intermediate plate over, and at this time, said discharge valve is opened to discharge the paper pulp in said reaction cavity. Thus, the efficiency of paper processing is effectively improved.

The device is simple in structure and convenient to use. The automatic structure adopted by this device realizes the automation of paper processing and effectively reduces the labor cost in the production process.

The above is only the specific embodiment of the invention, but the scope of the invention is not limited thereto, and any changes or substitutions without the creative work should be included in the claimed protection extent of this invention. Therefore, the claimed protection extent of the invention shall be determined with reference to the appended claims.

The invention claimed is:

1. A paper processing device, comprising:
a bottom block;
a connecting cavity fixedly arranged in said bottom block;
a penetrating cavity communicated with and arranged in a lower end wall of said connecting cavity,
wherein said penetrating cavity is communicated with the exterior space;
a lifting motor fixedly arranged in the lower end wall of said connecting cavity,
wherein an upper wall of output shaft of said lifting motor is fixedly provided with a driving pulley,
wherein a driven pulley in said connecting cavity is arranged on one side of said driving pulley,
wherein an inner threaded block is fixedly arranged in said driven pulley, and said inner threaded block is rotatably penetrating through an upper end wall of said connecting cavity and extends into the exterior space,
wherein a threaded rod is arranged in and in threaded fit connection with said inner threaded block, and said threaded rod extends into said penetrating cavity, and an upper end face of said threaded rod is rotatably provided with a lifting plate,
wherein a lower end face of said lifting plate is fixedly provided with symmetric slide levers, and symmetric penetrating cavities for sliding penetrating from upside to downside are arranged in said bottom block, and said slide levers extend into said penetrating cavities for sliding and are in sliding fit connection with said penetrating cavities for sliding, and an upper end face of said lifting plate is fixedly provided with symmetric heel blocks, and said lifting motor works to drive said driving pulley to rotate to drive said driven pulley to rotate, and at this time, said inner threaded block rotates to drive said threaded rod to move upwards, and then said stirring fan is driven to enter said reaction cavity, and said revolving motor works to drive said driving gear to rotate and then said driven gear is driven to rotate, and then the stirring fan fixed with said penetrating rod rotates to stir and smash the raw materials of paper in said reaction cavity, and the lower end face of said lifting plate is fixedly provided with a push cylinder, and one side of said push cylinder is provided with a connecting rod fixedly connected to the lower end face of said lifting plate;
wherein a push plate in sliding fit connection with said connecting rod is fixedly arranged at a lower end face of the push rod of said push cylinder,
wherein an upper end face of said push plate is fixedly provided with a coupling shaft,
wherein an upper end face of said coupling shaft is fixedly provided with a sliding shaft, and the upper end face of said lifting plate is fixedly provided with a rotating block;
wherein an intermediate plate is rotatably arranged in said rotating block,
wherein said intermediate plate touches against said heel blocks, and an opening cavity with an opening facing downwards is fixedly arranged in a lower end face of said intermediate plate, and said opening cavity is communicated with a sliding cavity, wherein said sliding cavity is in sliding fit connection with said sliding shaft, and an upper end face of said intermediate plate touches against and is provided with a container, and a reaction cavity with an opening facing upwards is fixedly arranged in said container,
wherein a connecting tube is communicated with and arranged in one end wall of said reaction cavity, and a discharge valve is communicated with and arranged in said connecting tube, and one end face of said bottom block is fixedly provided with a fixed rod,
wherein one end face of said fixed rod is fixedly provided with a concave block, wherein a concave cavity with an opening facing one side is fixedly arranged in said concave block;
a rotating rod fixedly arranged between an upper and lower end wall of said concave cavity;
a box extending to one side arranged in said concave cavity;
a rotating cavity fixedly arranged in said box,
wherein said rotating rod extends into said rotating cavity and is in rotational fit connection with said box,
wherein a transposition motor is fixedly arranged in an upper end wall of said rotating cavity, and a lower end face of the output shaft of said transposition motor is fixedly provided with a main gear,
wherein one side of said main gear is engaged with a pinion fixed with said rotating rod, and a transmission cavity in said box is arranged on one side of said rotating cavity;
a revolving motor fixedly arranged in an upper end wall of said transmission cavity;
wherein a lower end wall of the output shaft of said revolving motor is fixedly provided with a driving gear, and one side of said driving gear is engaged with a driven gear;
a penetrating rod arranged in said driven gear,
wherein said penetrating rod is in rotational fit connection with the upper end wall of said transmission cavity, wherein said penetrating rod rotatably penetrates through said transmission cavity and extends into the exterior space,
wherein a lower end face of said penetrating rod is fixedly provided with a stirring fan facing to said container, and one end wall of said fixed rod is provided with a warning device, and said push cylinder works to drive said push plate to push downwards to turn said intermediate plate over, and at this time, said discharge valve is opened to discharge the paper pulp in said reaction cavity so that the efficiency of paper processing is effectively improved.

2. The paper processing device according to claim 1, wherein one side of said transmission cavity is provided with a circular groove in said box,
wherein a motor in said box is arranged at the center of circle of said circular groove, and one end wall of the motor is in power connection with a fixed shaft, and an outer surface of said fixed shaft is fixedly provided with a pendulum rod, and said pendulum rod is in sliding fit connection with said circular groove, and one end face of said pendulum rod is fixedly provided with a tube-fixing block, wherein a nozzle is fixedly arranged in said tube-fixing block, and a switching valve is arranged in and communicated with said nozzle, and after the raw materials of paper in said reaction cavity is transformed into paper pulp, said switching valve is turned on so that the water is ejected from said nozzle, and the motor in an end face of said box drives said fixed shaft to rotate, so the water spraying angle of said nozzle is changed.

3. The paper processing device according to claim 1, wherein said sliding shaft is in a spheric structure and said sliding shaft is of the same shape as said sliding cavity, and said coupling shaft is in sliding fit connection with said opening cavity.

4. The paper processing device according to claim 1, wherein an outer surface of said stirring fan is fixedly provided with a plurality of stirring blades.

5. The paper processing device according to claim 1, wherein said inner threaded block is in rotational fit connection with said bottom block through a thrust ball bearing.

6. The paper processing device according to claim 1, wherein the warning device comprises a box block, and a connecting cavity with an opening facing to one side is fixedly arranged in said box block, wherein a wall connecting rod is fixedly arranged between an upper and lower wall of said connecting cavity, wherein an outer surface of said wall connecting rod is rotatably provided with a placing block, and one end face of said placing block is fixedly provided with a warning light which can perform the warning function.

* * * * *